United States Patent [19]

Hock et al.

[11] Patent Number: 4,974,070
[45] Date of Patent: Nov. 27, 1990

[54] COLORGRAPHIC REPRODUCTION SYSTEM

[75] Inventors: Allan G. Hock, Londonderry; Peter A. Supry, Nashua; Alvin D. Scholten, Pelham, all of N.H.

[73] Assignee: Howtek, Inc., Hudson, N.H.

[21] Appl. No.: 341,075

[22] Filed: Apr. 20, 1989

[51] Int. Cl.$^5$ .......................... H04N 1/46; G03F 3/08
[52] U.S. Cl. ........................................ 358/78; 358/80
[58] Field of Search ............................. 358/75, 78, 80

[56] References Cited

U.S. PATENT DOCUMENTS

| | | | |
|---|---|---|---|
| 4,058,828 | 11/1977 | Ladd | 358/80 |
| 4,636,844 | 1/1987 | Sasaki | 358/80 |
| 4,725,828 | 2/1988 | Cowlishaw | 358/80 |
| 4,814,867 | 3/1989 | Tsuda et al. | 358/80 |

Primary Examiner—John K. Peng
Assistant Examiner—Kim Y. Vu
Attorney, Agent, or Firm—Nutter, McClennen & Fish

[57] ABSTRACT

A color reproduction controller accesses corrected color values for driving an output color reproduction device by forming, for each color value of each pixel to be reproduced, a data pointer comprising a first word portion of a first color value and second and third word portions of second and third color values, the second and third word portions being smaller than the first word portion. The resultant words are smaller than those of the combined length of the color values from which they are formed and result in significantly smaller memory space.

5 Claims, 1 Drawing Sheet

COLORGRAPHIC REPRODUCTION SYSTEM

BACKGROUND OF THE INVENTION

Field of The Invention

The invention relates to color scanners, and comprises a scanner controller for efficiently generating the necessary color driving signals for an output device such as a color printer or the like.

B. Prior Art

Color reproduction is assuming an increasing role in the communication of information, since the information content of color presentations is often substantially greater than that of the corresponding black-and-white presentations. However, because of the increased information content, the memory, processing and other demands imposed by color reproduction are also generally much greater than those for black-and-white reproduction, and this has served to restrict the wider use of color.

In particular, color graphic printers are being used more frequently and in a wider range of applications. However, the color-reproduction quality of these is generally quite low, at least with respect to those which are priced to compete in the general home and office market. This is in part a function of the limitations imposed by the inks, among other elements, and in part a function of the stringent requirements which must be met to satisfy the visual senses.

For example, in reproducing a graphic image, slight color differences between the original and its reproduction are generally readily detectable by the unaided human eye, and may render the reproduction unacceptable for many purposes. To enhance the faithfulness of the reproduction, it is usually necessary to increase the amount of information in the original that is attempted to be carried through to the reproduction. For example, a scanner having a comparatively high resolution may be used. However, this increases the complexity, and thus the cost, of the requisite image processing elements. Accordingly, high quality image reproduction devices have not heretofore been available at reasonable cost in the home and office product market.

SUMMARY OF THE INVENTION

A. Objects of The Invention

Accordingly, it is an object of the invention to provide a scanner controller.

Further, it is an object of the invention to provide an improved controller for a color graphics scanner.

Still another object of the invention is to provide an economical, high quality color graphics scanner controller.

B. Brief Summary of The Invention

In accordance with the present invention, a color scanner controller receives a plurality of data words indicative of a corresponding plurality of color values $C_i$ in an image element to be reproduced. Typically, the colors comprise the primary colors red, green, blue (designated as "R","G", "B") or their complements cyan, magenta, yellow ("C", "M", "Y"), and the data words comprise numbers indicative of the content of the respective colors in the image element. For purposes of the present invention, the data may be considered to have been generated by a scanning device which scans a graphic image and outputs a numeric indication $C_i'$ of the perceived "color value" (e.g., intensity and hue) of each image element for each of the colors to be utilized. Typically, the scanner provides outputs R', G', B' corresponding to various mixtures of the input primary colors red, green, blue (R, G, B). These output values (the "scanned data") are transformed by the controller in the manner described more fully hereinafter, to correct for inherent nonlinearities and other sources of error, and the resultant data (the "corrected data") are then applied to an output device such as a printer to enable reproduction of the scanned image.

Typically, the output of a scanner in response to a given input is highly dependent on the particular mix of input colors being scanned, as well as their relative intensities. This is particularly the case with respect to comparatively inexpensive scanners of the type commonly used in small business establishments that are not engaged in commercial high fidelity color reproduction. It is the function of the controller to correct for this deviation.

In accordance with the invention, a standard sample exhibiting a variety of known color content is scanned by the scanner to be compensated. For each image element of the sample, the values output by the scanner are recorded for each of a set of chosen colors; advantageously, these are the primary colors red, green, blue. Preferably, the output values are made available in the form of digital signals or "words". We have found that words of eight bits in length (thereby providing $2^8 = 256$ different values) provide sufficient resolution to enable quality color reproduction. Advantageously, the standard sample may be formed in accordance with the "Matchprint" process of the Minnesota Mining and Manufacturing Corp. ("3M") in which color blocks of preselected and well defined hues and intensity can be formed on a sample sheet to thereby establish defined values for the input reference color samples. For each selected hue in the samples, the intensity may conveniently be varied to select intensities of, for example, 0%, 20%, 40%, 60%, 80%, and 100% of maximum intensity. For an eight bit data word, having a maximum value of 256, these intensities are represented as data input values of 00000000, 00110011, 01100110, etc. This provides a total of six intensity values per hue, and thus a total of $6 \times 6 \times 6 = 216$ possible combinations of hue and intensity for the typical three-color system. Each of these standard input combinations is scanned by the scanner which then generates, for each sample, a triplet of data output words, R', G', B' defining the color content of each of the three colors R, G, B in the sample as determined by the scanner.

Typically, the data output values for the sample (scanned data) will differ in a nonlinear manner from the standard data input values (source data) characteristic of that sample, and thus a linear extrapolation of all possible output values based on the limited sample input values is not appropriate. Accordingly, a regression analysis is performed, with the standard source input data values as independent variables, and the corresponding scanner data output values as dependent variables. Regression analysis is well known, and will not be described in detail herein. Briefly, for each color and for each image element, the regression equations are of the form:

$$R' = f_1(R, G, B) \quad (1)$$
$$= a_1 R + a_2 G + a_3 B + a_{12} RG + a_{13} RB +$$
$$a_{23} GB + a_{11} R^2 + a_{22} G^2 + a_{33} B^2 + \ldots$$

where R' is the scanner output value for the color red, and R, G, B are the standard source data color values characterizing the given sample image element. Similar equations are used for the G' and B' values. Preferably, a fourth order regression is used, so that the above sample equation will have all terms and cross terms up to the fourth order. The regressions determine the coefficients $a_{ij}$ of the source data input values R, G, B, and thus define the transformation from these values to the scanner output data values, R', G', B'.

Using the coefficients so determined, the output values R', G', B' corresponding to each of the $2^8 \times 2^8 \times 2^8 = 2^{24}$ possible combinations of R, G, B input states can be calculated and stored for later recall. This would normally require $3 \times 2^{24}$ computations of the form shown in (1) above, a time consuming task in itself. More importantly, however, it would require $3 \times 2^{24} = 48$ Mbytes of storage. The cost of such massive storage is well beyond the reach of most commercial users, particularly small business users, and thus the cost of high quality scanners has heretofore been prohibitive.

In accordance with the present invention, however, we dramatically reduce the amount of storage required for the transformation results, by using, as the basis for storage and retrieval, at least a major portion of the full scanned data value for the primary hue whose color value is being determined by scanning, and a lesser portion of the full scanned data value for the remaining primary hues. Specifically, for each picture element ("pixel") that is scanned by the scanner and for each primary hue (R', G', B') in the scanner output, the controller of the present invention forms a composite address comprising an m bit number, in which k bits are obtained from the scanner output corresponding to that hue, and a lesser number of bits (j and l, respectively) are obtained from the scanner output corresponding to the remaining hues, $k > j, l$, $m = j + k + l$.

For example, in accordance with the preferred embodiment of the invention, in forming that portion of the storage table corresponding to the transformation $R' = f_1(R, G, B)$ above, and using eight-bit data words, the controller uses the full eight bits of the R' scanner output, and uses the four high order bits of each of the G' and B' scanner outputs to form a composite sixteen-bit address. This address serves as a pointer $P_R''$ to the entry in a pre-stored table in the controller which gives the corrected color value R'' that comprises the output of the controller and which is to be applied to a reproduction device such as a printer to establish the color (hue and intensity) to be output by the device. Similarly, the controller forms the address pointer $P_G''$ to the corrected color output G'' from the G' scanner output by using the eight data bits of the G' scanner output, and the four high-order data bits of each of the R' and B' scanner outputs. The address pointer $P_B''$ to the corrected color output B'' is formed from the B' scanner output in a similar manner.

A triplet of tables $T_R''$, $T_G''$, $T_B''$ within the controller stores the corrected color values R'', G'', B'' corresponding to the scanner outputs. These values are computed for each possible input color combination in accordance with equations of the form of equation (1) as described above and using the color coefficients $a_{ij}$ determined from the regression analysis as previously described. For each image element that is scanned, the composite address or pointer $P_i$ for each of the primary colors $C_i'$ into which the image is resolved by the scanner points to the corrected color value $C_i''$ for that color. This value is applied to the reproduction device in order to reproduce the scanned image.

The resultant controller significantly reduces the amount of storage required for the data. For example, in a system in which data words resulting from scanning are eight bits long, representing $2^8 = 256$ different color values for each data word, and using three primary colors, the number of color values required to be stored is $3 \times 2^{24} = 48$ Mbytes! Through use of the present invention, however, the requisite storage is reduced to $3 \times 2^{16}$, a total of 192 Kbytes. This dramatically reduces the cost of the requisite memory, and thus of the system, and enables the manufacture of a high quality color reproduction system that is feasible and economical even for small business users.

DETAILED DESCRIPTION OF THE INVENTION

The foregoing and other and further objects of the invention will be more readily understood on reference to the following detailed description of the invention when taken in conjunction with the accompanying drawings in which.

Figure 1:
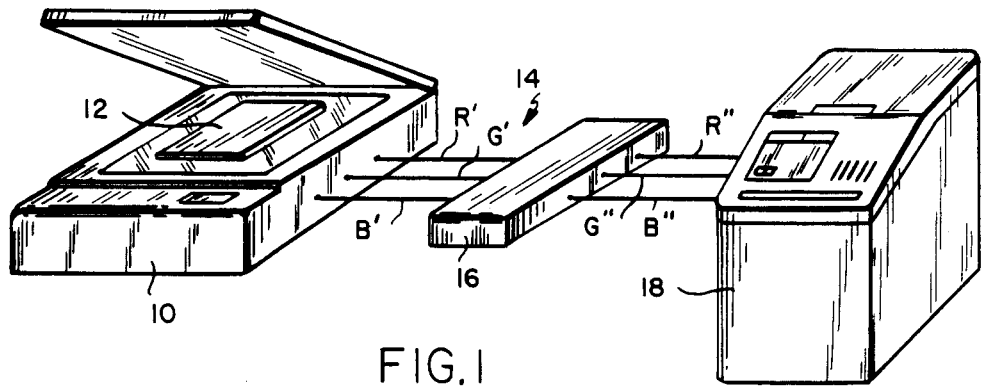
FIG. 1 is a pictorial view of a color reproduction system comprising a scanner, a printer, and a controller in accordance with the present invention.

In FIG. 1, a color reproduction system of the type particularly suited for use with the present invention comprises a color scanner 10 for scanning a document 12. The scanner provides outputs on signal lines 14 that are indicative of the color values of each of the scanned elements. Typically, the scanner outputs comprise red, green and blue color value signals (R', G', B') indicative of the red, green and blue content of the scanned elements. In accordance with the present invention, these signals are applied to a color reproduction controller 16 before being fed to the desired output device, shown here as a printer 18.

Figure 2A:
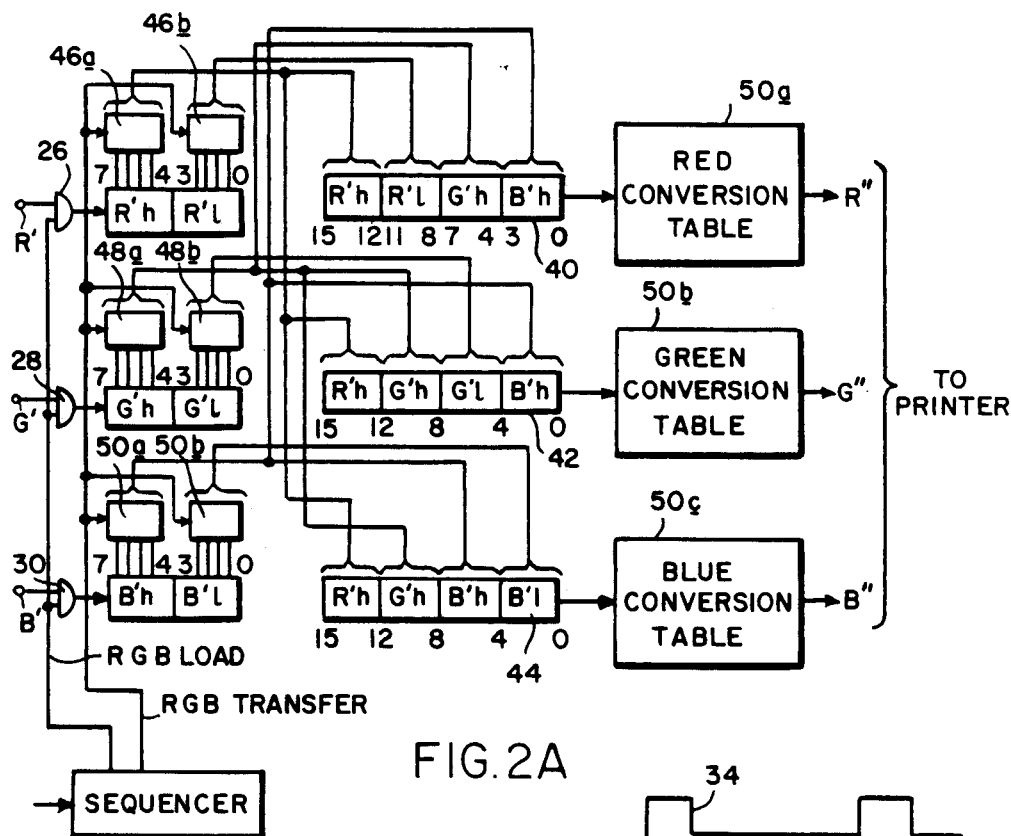
FIG. 2A is a block and line diagram showing the controller of the present invention in greater detail.
Figure 2B:
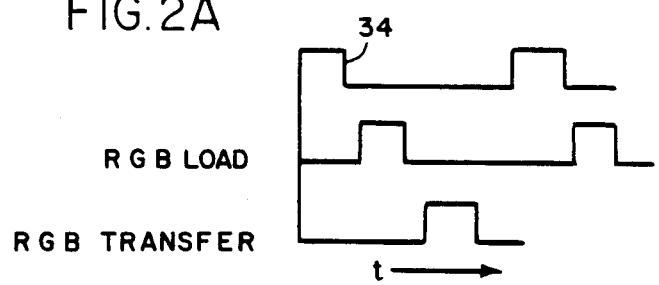
FIG. 2B is a timing diagram for the controller of FIG. 2A.

The controller 16 is shown in detail in FIG. 2. The controller receives the R', G', B' scanner output data in registers 20, 22, 24, respectively. It is assumed that the scanner output data is supplied to the controller in digital form. If this is not the case, the output data is first converted to digital form, and then applied to the controller as indicated. The data is fed into the respective registers through AND gates 26, 28, 30, respectively. These gates are energized from a sequencer 32 in synchrony with the operation of the scanner as manifested by a control input 34 to the sequencer from the scanner which indicates the progress of the scan. For purposes of understanding, the scanner may be viewed as providing an output for each scan element (pixel), together with a control signal 34 indicating the availability of each successive pixel. As shown in FIG. 2A, following receipt of control signal 34 from the scanner indicating the availability of a new source data word, the sequencer 32 energizes gates 26–30 via the load signal RGB$_{load}$ to thereby load the source data words into registers 20–24, respectively.

Registers 20–24 are connected to registers 40–44 through gates 46a, 46b, 48a, 48b, 50a, and 50b. Registers 40–44 are similar to registers 20–24, but are of greater length. For ease of explanation, it will be assumed that the source data words are 8 bits in length although any length data word may, of course, be used as desired. The registers 20–24 are then 8 bits long, while the registers 40–44 are of greater length, e.g., 16 bits, for reasons now to be explained. To facilitate the description, the bit positions of the registers are numbered in FIG. 2, starting from lower order bit 0 at the right of register 20 to higher order bit 7 at the left, and similarly for the registers 22 and 24. Registers 40–44 are similarly numbered from bit positions 0 to 15. The bit positions themselves are referred to as $d_i$, e.g., $d_7$ is bit position 7.

Following the loading of register 20 with a data word, its contents are selectively transferred to registers 40–44. In particular, the sequencer 32 energizes gates 46a and 46b via the transfer signal RGB transfer to cause the entire 8 bit contents of the "red" color value register 20, i.e. bits $d_7$–$d_0$, to be loaded into the higher order 8 bits, bits $d_{15}$–$d_8$, of register 40. At the same time, the four higher order bits of register 20, $d_7$–$d_4$, are loaded into bit positions $d_{15}$–$d_{12}$ of registers 42 and 44. In similar fashion, gates 48a and 48b are energized at this time to load the entire contents, $d_7$–$d_0$, of register 22 into bit positions $d_{11}$–$d_4$ of register 42, and to load the higher order bits, $d_7$–$d_4$, of register 22 into bit positions $d_7$–$d_4$ of register 40, as well as into bit positions $d_{11}$–$d_8$ of register 44. A similar process takes place with register 24, so that its entire contents, $d_7$–$d_0$, is loaded into bit positions $d_7$–$d_0$ of register 44, and its higher order bits, $d_7$–$d_4$, are loaded into bit positions $d_3$–$d_0$ of registers 40 and 42.

The resultant digital words formed in the registers 40–44 comprise corrected color pointers to a conversion table 50 preferably stored in random access memory. For each color pointer, there is stored in the table a driver value (R", B" or G") which comprises the driving signal to be applied to the output device (e.g., a printer) in order to faithfully reproduce the color that characterizes the corresponding pixel scanned by the scanner. The driver value stored at a particular location in the regression equations (1) as a dependent variable (e.g., in place one of the variables R, G, B) together with the corresponding driver values of the remaining colors which are to form a pixel, give the scanner values R', G', B', from which the pointers $P_{R''}$, $P_{G''}$, $P_{B''}$ which point to these values are formed.

The potential number of driver values for a scanner system using three primary colors and an eight-bit data word is $(2^8)^3 = 2^{24}$ values. This memory requirement is excessive under present technology, and by itself can prevent the development of high quality low cost scanners. The scan converter of the present invention, however, selectively "maps" these values into a smaller memory space by using as a pointer address for each color the full eight data bits of the color in question but only the four higher order data bits of the other colors, as described above. This enables the construction of high quality, high resolution, low cost color scanners.

CONCLUSION

From the foregoing it will be seen that I have described a color reproduction controller that dramatically reduces the memory requirements needed to obtain faithful color reproduction. The controller is readily implemented with conventional technology, and is sufficiently inexpensive as to enable its use by even small businesses.

Although the invention has been described with reference to particular word sizes and register configurations, it will be understood by those skilled in the art that it is not so limited, and that various changes may be made in the foregoing without departing from either the spirit or the scope of the invention.

Having illustrated and described my invention, I claim:

1. A color reproduction controller, comprising:
    A. a first set of memory storage elements for receiving a plurality of data words indicative of a corresponding plurality of detected color values in an input source element,
    B. a second set of memory storage elements, each of length greater than any of said first set of memory storage elements but less than that of the combined length of the memory elements of said first set of elements,
    C. sequence control means generating first and second transfer signals for each pixel being scanned,
    D. first gating means responsive to said first transfer signal for loading the memory elements of said first memory element set with respective data words corresponding to selected colors to be reproduced,
    E. second gating means responsive to said second transfer signal for loading the respective memory elements of said second set of memory elements with a first portion of a data word from one of the memory elements of the first memory element set and second and third portions, smaller than said first portion, of the remaining memory elements of said first set, and
    F. means responsive to the data words of said second set of memory elements for retrieving converted color values for driving an output color reproduction device.

2. A color reproduction controller according to claim 1 in which the memory elements of said second set of memory elements are arranged to receive, for each color, a composite data word that includes a larger portion of the data word corresponding to that color than that of any data word corresponding to any other color.

3. A color reproduction controller according to claim 2 in which the memory elements of said second set of memory elements are arranged to receive, for each color, a composite data word comprising substantially the entire data word corresponding to that color, and less than the entire data word corresponding to each other detected color.

4. A color reproduction controller according to claim 3 in which the memory elements of said second set of memory elements comprise for each color, a storage register for receiving substantially the entire data word corresponding to that color, as well as portions of the data words corresponding to said other colors.

5. A color reproduction controller according to claim 4 in which said data words include high-order and low-order portions, and in which each said storage register is connected to receive the high order portion of one of said data words and the low order portion of each of the other of said data words.

* * * * *